Dec. 31, 1957     J. W. McELGIN     2,818,217
AIR CONDITIONING SYSTEM AND METHOD OF OPERATION
Filed May 20, 1954     2 Sheets-Sheet 1
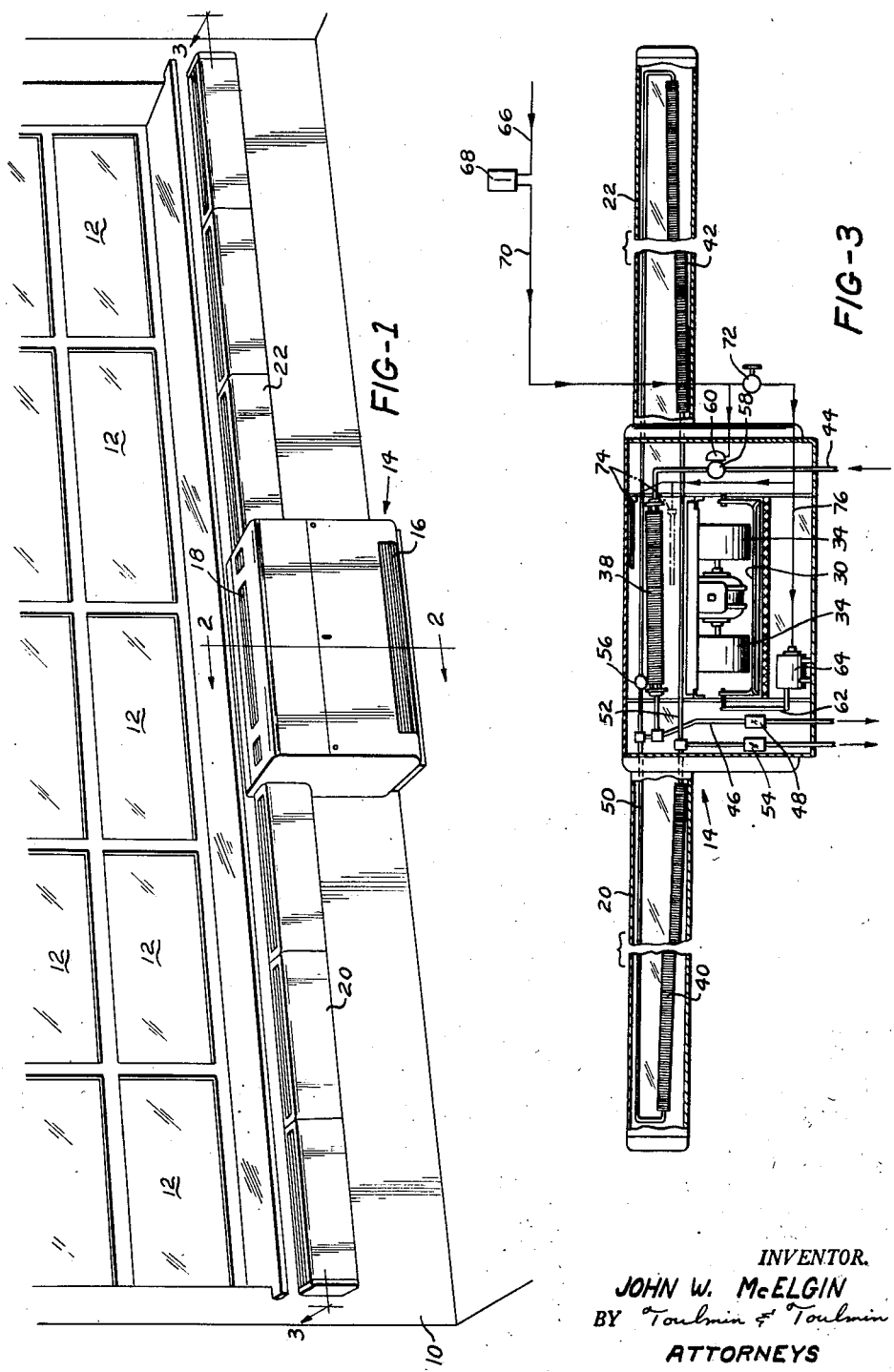
INVENTOR.
JOHN W. McELGIN
BY Toulmin & Toulmin
ATTORNEYS

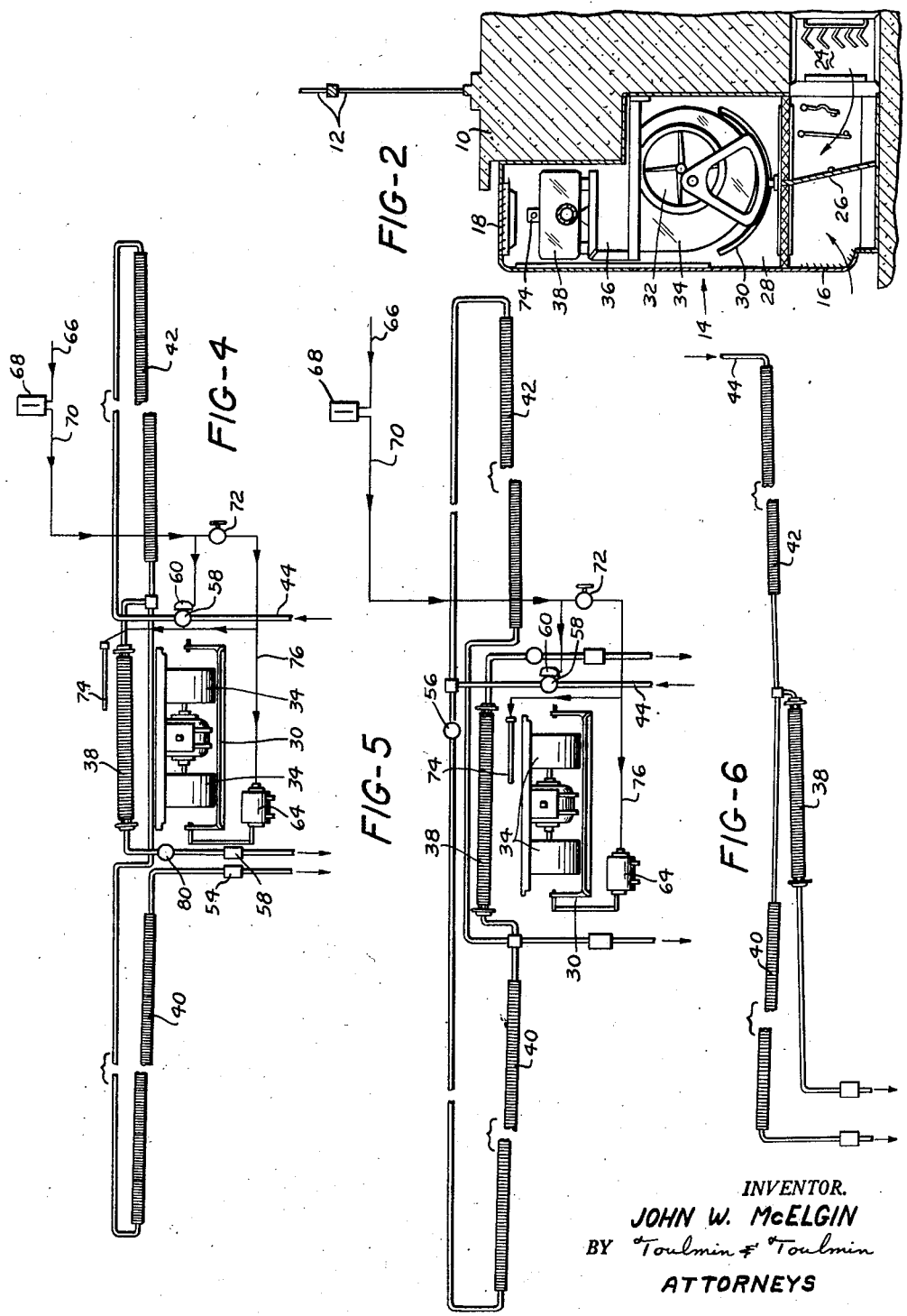

United States Patent Office 2,818,217
Patented Dec. 31, 1957

2,818,217

AIR CONDITIONING SYSTEM AND METHOD OF OPERATION

John W. McElgin, Philadelphia, Pa., assignor to John J. Nesbitt, Inc., Philadelphia, Pa., a corporation of Pennsylvania Application May 20, 1954, Serial No. 431,089

5 Claims. (Cl. 237—2)

This invention relates to air conditioning systems, and particularly to air conditioning systems comprising a main ventilator unit having a blower therein in combination with auxiliary convector units extending therefrom adapted for being positioned along the sills of windows.

Air conditioning systems of the nature referred to above are particularly adapted and are principally used in rooms such as schoolrooms and the like having extensive window areas along one wall. Such a system is installed with the main ventilator unit in about the middle of the wall and the convectors extending in opposite directions therefrom along the sills of the windows in the wall.

The ventilator unit of the nature referred to consists, generally, of a blower adapted for blowing air through a heating element into the room and having passage means leading to its inlet from the room and also from the outdoors. The proportion of air drawn inwardly through the two passages is regulated by a damper so that when the room is first warming up substantially all of the air blown by the ventilator is taken from the room, whereas after the room has warmed up a certain proportion of outside air is continuously introduced into the room.

In a system of this nature, during the warm-up period of the room, a heating medium such as steam or hot water is supplied to the heating elements in the convector units and also to the heating element in the main ventilator unit.

Under these conditions the ventilator unit blows a blast of conditioned air into the room, while the convector units heat the air and cause it to rise by convection therethrough in a curtain in front of the windows, thus counteracting cold downdrafts which are characteristic of window installations of this nature.

The control of the supply of heating medium to the heating elements of the main ventilator unit and the convector units is generally under the joint control of a room thermostat located at some suitable place in the room, and an airstream thermostat which is positioned in the main ventilator unit either upstream or downstream of the heating element therein.

The position of the damper in the ventilator unit is ordinarily initially under the control of the room thermostat and then, after the room is up to temperature, is directly under the control of the airstream thermostat for maintaining the temperature of the blown air within predetermined limits.

Under certain conditions, however, as, for example, when the room is up to about the proper temperature and the damper opens to admit a fairly large proportion of outdoor air, say, up to 50% or more, the resulting mixture of outdoor and indoor air might be at a temperature too low for induction into the room, and the mixture, accordingly, requires heating to bring it to the right temperature. Because of this the airstream thermostat, when it influences the control valve for the heating medium, can readily introduce a problem of overheating the room by supplying some heat to the air blown by the ventilator unit, although the blown air is still cool, while the same supply of heating medium will cause the convector units to supply warm air to the room. The two portions of the air conditioning system will thus be operating in opposition and causing an inefficient operation of the device, faulty control of the temperature of the room, and improper distribution of the treated air in the room.

Attempts have been made to overcome this particular difficulty by providing independent control valves for controlling the supply of heating medium to the heating elements of the main ventilator unit and the auxiliary convector units so that the convector units were never supplied with heating medium when the ventilator unit was on its cooling cycle.

Other attempts to overcome this drawback have utilized an auxiliary heating element in the ventilator unit operable to temper the blown air without there being any supply of heating medium to the heating element of the main ventilator unit or to the heating elements of the convector units.

None of these attempts, however, have been particularly successful, and likewise have been expensive in requiring extra valves and extra heating elements and special control arrangements.

Having the foregoing in mind, it is a primary object of the present invention to devise a control system for an air conditioning system of the nature described which avoids the difficulties referred to above.

A particular object of the present invention is the provision of a control system for an air conditioning arrangement of the nature referred to which prevents overheating of the room due to hunting of the control system.

A further object of the present invention is the provision of an arrangement for controlling the supply of heating medium to the heating elements of the main ventilator unit and auxiliary convector units, such that there is never a supply of heating medium to the convector units when the room thermostat indicates a need for circulating cool air within the room.

A still further object of the present invention is the provision of a simplified control system, including a single control valve for controlling the supply of heating medium to the heating elements of a combination of a ventilator unit and auxiliary convection units of the nature described.

These and other objects and advantages of this invention will become more apparent upon reference to the following specification taken in connection with the accompanying drawings, wherein:

Figure 1 is a perspective view showing an air conditioning installation according to the present invention;

Figure 2 is a vertical section through the main ventilator unit indicated by line 2—2 on Figure 1;

Figure 3 is a vertical longitudinal sectional view through both the ventilator unit and the convector units indicated by line 3—3 on Figure 1;

Figure 4 is a view similar to Figure 3 showing a different connection for the heating elements of the ventilator unit and convector units;

Figure 5 is a view like Figure 4 but showing a still further different connection between the heating units; and Figure 6 is a more or less diagrammatic view showing still another connection arrangement for the heating elements.

Referring to the drawings somewhat more in detail, Figure 1 shows a room having a wall 10 with windows 12. In about the middle of wall 10 is a ventilator unit 14 having an inlet opening 16 opening into the room and discharge openings 18 in the top for the discharge of treated air into the room.

Extending out opposite directions from the main ventilator unit 14 along the sills of windows 12 are the auxiliary convector units 20 and 22, each of which has therein a heating element as will be seen hereinafter.

Turning now to Figure 2, it will be seen that the main ventilator unit 14 also has an inlet opening 24 opening to the outdoors, and that openings 16 and 24 are separated by a partition 26. Each of the said openings communicates, on its respective side of partition 26, with a chamber 28, and a roll damper 30 is provided which is movable for varying the degree of communication of the said openings with the chamber 28 thereby to vary the proportions of outdoor and indoor air that are drawn into the said chamber.

Located with its inlet 32 in communication with chamber 28 is a blower 34 adapted for discharging via a channel 36 through outlet opening 18 into the room.

A heating element 38 is positioned between the discharge side of the blower and discharge openings 18, and this heating element may comprise one or multiple tubes or pipes having fins thereon for effecting an efficient exchange of heat between the heating medium passing through the tubes or pipes and the air blown through the heating element.

Turning now to Figure 3, it will be seen therein that the convector units 20 and 22 have located therein heating elements 40 and 42, respectively, each of which consists of single loop of pipe or tubing having the lower reach thereof finned. The convector units are provided with openings top and bottom so that air will be heated and rise therethrough when a heating medium is supplied to heating elements 40 and 42.

According to the connection arrangement of Figure 3, a supply conduit 44 for heating medium leads to one end of the heating element 38 of the ventilator unit and the other end of heating element 38 is connected by conduit 46 through trap 48 to drain, and is also connected with the conduit means 50 leading to the opposite ends of the convector heating elements 40 and 42. The inner ends of the finned reaches of the heating elements 40 and 42 are interconnected by a conduit 52 and this conduit is connected through a trap 54 with a drain.

Inasmuch as the heating elements of the convector units might be of respectively different lengths and exhibit different degrees of resistance to fluid flow therethrough, it is preferred to have a restrictor valve 56 arranged in series with one of the heating elements 40 and 42 that exhibits the least resistance to fluid flow therethrough in order to balance the fluid supply through the convectors.

Conduit 44 has therein a control valve 58 of a substantially conventional nature which is associated with the pressure responsive actuator 60. The roll damper 30 previously referred to is connected by means of linkage 62 with a fluid pressure responsive motor 64.

The control system of this invention is illustrated as being a pneumatic arrangement, but it will be understood that an electrical system could be devised effecting substantially the same type of control. The control system illustrated in Figure 3 comprises a supply conduit 66 which supplies air at a predetermined pressure to room thermostat 68.

A conduit 70 leads from room thermostat 68 to the fluid pressure responsive actuator 60, and thence through a restrictor valve 72 to the damper motor 64 and also to the room thermostat 74 which may be positioned either upstream or downstream of the heating element 38 of the ventilator unit.

The particular structure of the thermostats 68 and 74 forms no part of the present invention, except as to their function and may be of a substantially conventional nature. In general, however, the thermostats include bleed ports opening to the atmosphere and adapted for being increasingly restricted as the thermostats increase in temperature.

The fluid pressure actuator 60 for control valve 58 is so arranged that it will urge the valve toward closed position in response to increasing pressures in conduit 70. Similarly, damper motor 64 is responsive to increasing pressures in conduit 76 which connects it with airstream thermostat 74 for moving toward a position to admit more outside air.

The operation of the system is described as follows:

During the heating up period of the room damper 30 is closed to outdoor air and control valve 58 is wide open, thus supplying heating medium to the heating elements 38, 40 and 42. A few degrees below the required room temperature, say at 67° F., the damper 30 opens an amount sufficient to admit the specified minimum quantity of outdoor air. This movement of the damper is brought about by an increase in the pressure in conduit 70 as determined by the room thermostat 68. The damper motor is arranged to halt in this position and remain stationary for a period of time.

From 67° to 70° the room thermostat will increase the pressure in conduit 70 to the point that actuator 60 will close control valve 58.

After the room has reached a temperature of 70° the room thermostat becomes inoperative and the control of the system is taken over by airstream thermostat 74. The airstream thermostat operates to regulate the discharge temperature of the ventilator unit by controlling the fresh air and recirculating damper 30.

Unless the temperature of the blown air at the minimum damper position referred to above coincides with the airstream control temperature the quantity of outdoor air being introduced will change. That is, if the mixture of air is above the airstream control temperature the damper will be opened to admit more outdoor air, whereas if the mixture is below the airstream temperature the damper will be closed to admit less outdoor air.

It will be seen from the foregoing that the airstream thermostat 74 is so located in the control circuit that it cannot influence the operation of control valve 58, and that, accordingly, a single control valve can be employed for controlling the entire supply of heating medium to all of the heating elements of the system. It will also be noted that the airstream thermostat cannot cause overheating by admitting steam to the heating elements contrary to the demands of the room thermostat.

The Figure 3 arrangement shows the heating medium passing first through the heating element 38 over the ventilator unit, and then through the heating elements 40 and 42 of the convector units in parallel. The system of the present invention, however, is also adapted for other connection schemes, some of which are illustrated in Figures 4, 5 and 6, and in which views the reference numerals coresponding to those of Figures 1 through 3 are employed where applicable.

In Figure 4 the supply conduit 44 is connected to supply heating element 42, whence the heating medium then passes through heating element 38 and heating element 40 in parallel. With this arrangement there is advantageously provided a restrictor valve 80 in series with the heating element 38 to insure an adequate supply of heating medium to heating element 40.

In Figure 6 the supply conduit 44 is connected to supply the heating elements 40 and 42 in parallel, with the discharge ends of heating elements 40 and 42 being interconnected and connected with one end of heating element 38.

Figure 6 merely illustrates a connection diagram substantially identical with the one of Figure 5, except that heating medium is introduced from one end of the system and taken from the system at the opposite end. This scheme has the advantage of permitting all piping be accomplished in the walls of the room, and eliminating the necessity of carrying pipes to the center of the room either above the floor or within the floor of the room.

The Figure 5 arrangement also illustrates a somewhat modified control system adapted for having incorporated therein a feature of the single control valve.

It will be understood that this invention is susceptible to modification in order to adapt it to different usages and conditions, and, accordingly, it is desired to comprehend such modifications within this invention as may fall within the scope of the appended claims.

I claim:

1. In an air conditioning system for positioning against a wall of a room; a main ventilator unit having a heating element, a blower, outdoor and indoor air inlets, and a damper normally closing said outdoor inlet and movable for increasing the effective size of the outdoor inlet while restricting the indoor inlet; auxiliary convector units extending laterally outwardly from the main unit and adapted to be positioned along window sills and each having a heating element, a common source of heating medium for all of said heating elements, a single control valve mounted within said main unit connecting said common source with said heating elements, at least two of said heating elements being connected in parallel and in series with the remaining heating element, a control circuit sensitive to the temperature of the room conditioned by the system and to the temperature of the air blown through the main unit for closing said valve before the damper moves beyond the predetermined minimum outdoor air position as the room warms, and means in said control circuit for rendering said damper responsive solely to the temperature of the main unit air stream when a desired room temperature is reached.

2. In an air conditioning system as claimed in claim 1 with the heating elements of the convectors being connected in parallel with each other and in series with the heating element of the main unit.

3. In an air conditioning system as claimed in claim 1 with the heating elements of the convector units being in parallel with each other and in series with the heating element of the main unit, with the heating elements of the convector units being closest to the control valve.

4. In an air conditioning system as claimed in claim 1 with the convector heating elements being in series with the heating elements of the main unit being in parallel with at least one thereof.

5. In an air conditioning system as claimed in claim 1 with the heating element of the main unit being closest to the control valve.

References Cited in the file of this patent
UNITED STATES PATENTS

| | | |
|---|---|---|
| 1,972,766 | Ewald | Sept. 4, 1934 |
| 2,225,956 | Haines et al. | Dec. 24, 1940 |
| 2,290,985 | McElgin | July 28, 1942 |
| 2,637,500 | Kessler | May 5, 1953 |
| 2,694,526 | Lehane | Nov. 16, 1954 |